US009682455B2

(12) United States Patent
Piner et al.

(10) Patent No.: US 9,682,455 B2
(45) Date of Patent: Jun. 20, 2017

(54) CHATTER APPLICATION INTERFACE

(71) Applicant: DMG MORI SEIKI CO., LTD, Yamatokoriyama-shi (JP)

(72) Inventors: Zachary Piner, West Sacramento, CA (US); Ke Ding, Davis, CA (US); Mehdi Namazi, West Sactamento, CA (US); Kyle Konishi, Sacramento, CA (US)

(73) Assignee: DMG MORI SEIKI CO., LTD., Yamatokoriyama-shi (JP)

( * ) Notice: Subject to any disclaimer, the term of this patent is extended or adjusted under 35 U.S.C. 154(b) by 274 days.

(21) Appl. No.: 14/526,111

(22) Filed: Oct. 28, 2014

(65) Prior Publication Data

US 2016/0116899 A1    Apr. 28, 2016

(51) Int. Cl.
*B23Q 17/12* (2006.01)
*G05B 19/404* (2006.01)
*B23Q 17/09* (2006.01)
*B23Q 11/00* (2006.01)

(52) U.S. Cl.
CPC ......... *B23Q 17/12* (2013.01); *B23Q 11/0039* (2013.01); *B23Q 17/0976* (2013.01); *G05B 19/404* (2013.01); *G05B 2219/32128* (2013.01); *G05B 2219/37434* (2013.01); *G05B 2219/41115* (2013.01); *G05B 2219/41256* (2013.01)

(58) Field of Classification Search
CPC ........... G05B 2219/37434; G05B 2219/41115; G05B 2219/41256; B23Q 11/0032; B23Q 11/0039; B23Q 17/12; B23Q 17/0976
See application file for complete search history.

(56) References Cited

U.S. PATENT DOCUMENTS

| 5,170,358 A | 12/1992 | Delio |
| 6,085,121 A * | 7/2000 | Stern ................. B23Q 17/0976 340/680 |
| 6,672,168 B2 * | 1/2004 | Higgins ................ G01H 11/08 73/660 |

(Continued)

FOREIGN PATENT DOCUMENTS

| JP | 2011062768 A * | 3/2011 |
| JP | 2012111020 A * | 6/2012 |

OTHER PUBLICATIONS

U.S. Appl. No. 14/674,291, filed Mar. 31, 2015, Piner, et al.

*Primary Examiner* — Crystal J Barnes-Bullock
(74) *Attorney, Agent, or Firm* — Oblon, McClelland, Maier & Neustadt, L.L.P.

(57) ABSTRACT

A system, method, and computer-readable medium for providing a user interface. The system includes circuitry configured to generate chatter information based on sensor data collected from a machining operation of a machine performed at a previously selected tool speed setting. The chatter information includes a chatter level value and a chatter frequency value. A plurality of different candidate tool speed settings is determined based on the generated chatter frequency value from the machining operation. The circuitry generates the user interface that includes a plurality of different tool speed settings, including the previously selected tool speed setting and the plurality of different candidate tool speed settings for selection by a user. The user interface is configured to indicate the chatter level value for the previously selected.

20 Claims, 16 Drawing Sheets

(56) References Cited

U.S. PATENT DOCUMENTS

| | | | | |
|---|---|---|---|---|
| 8,374,717 B2* | 2/2013 | Suzuki | ............... | B23Q 11/0039 409/131 |
| 8,700,201 B2* | 4/2014 | Yoshino | ............. | B23Q 17/0976 700/174 |
| 8,862,429 B2* | 10/2014 | Ando | ..................... | B23Q 17/12 702/145 |
| 2011/0135415 A1* | 6/2011 | Hamaguchi | ........ | B23Q 11/0032 409/79 |
| 2015/0160643 A1* | 6/2015 | Fujimoto | ............. | G05B 19/404 700/159 |

* cited by examiner

CHATTER APPLICATION INTERFACE

BACKGROUND

Field of the Disclosure

This application relates to a system, method, computer-readable medium, and interface for reducing machine tool chatter.

Description of the Related Art

As described for example in U.S. Pat. No. 5,170,358, which is incorporated herein by reference in its entirety, chatter or instability in machining operations, such as turning, boring, milling and the like, is a common problem in industry. Vibrations are primarily categorized into free, forced, and self-excited vibrations. Chatter is a type of self-excited vibration commonly observed during a machining operation (or process). Chatter can also be produced from forced vibrations under certain operating conditions.

Chatter is unwanted vibrations observed during the machining operation. It can be caused by a detrimental vibration feedback loop through a machine tool, a work piece, and a machine. When occurring, vibrations from the feedback loop can often be attenuated by changing tool rotation speed (changing driving vibration frequency) in relation to chatter frequency (response frequency). Embodiments of the present disclosure are directed to facilitating chatter reduction.

SUMMARY

According to an embodiment of the present disclosure, there is provided a system. The system includes circuitry that is configured to generate chatter information based on sensor data collected from a machining operation performed at a previously selected tool speed setting. The chatter information includes a chatter level value and a chatter frequency value. The circuitry determines a plurality of different candidate tool speed settings, which are predicted to reduce or eliminate chatter, based on the generated chatter frequency value from the machining operation. The circuitry generates a user interface that includes a plurality of different tool speed settings, including the previously selected tool speed setting and the plurality of different candidate tool speed settings for selection by a user. The user interface is configured to indicate the chatter level value for the previously selected tool speed setting.

Further, according to an embodiment of the present disclosure, there is provided a method for controlling chatter. The method includes generating, by circuitry, chatter information based on sensor data collected from a machining operation performed at a previously selected tool speed setting. The chatter information includes a chatter level value and a chatter frequency value. A plurality of different candidate tool speed settings, which are predicted to reduce or eliminate chatter, based on the generated chatter frequency value from the machining operation is determined by the circuitry. A user interface that includes a plurality of different tool speed settings, including the previously selected speed setting and the plurality of different candidate tool speed settings for selection by a user, is generated by the circuitry. The method further includes indicating, in the user interface by the circuitry, the chatter level value for the previously selected.

Further, according to an embodiment of the present disclosure, there is provided a non-transitory computer-readable medium which stores a program which, when executed by a computer, causes the computer to perform the method for controlling chatter, as discussed above.

The forgoing general description of the illustrative implementations and the following detailed description thereof are merely exemplary aspects of the teachings of this disclosure, and are not restrictive.

DETAILED DESCRIPTION

Figure 1:
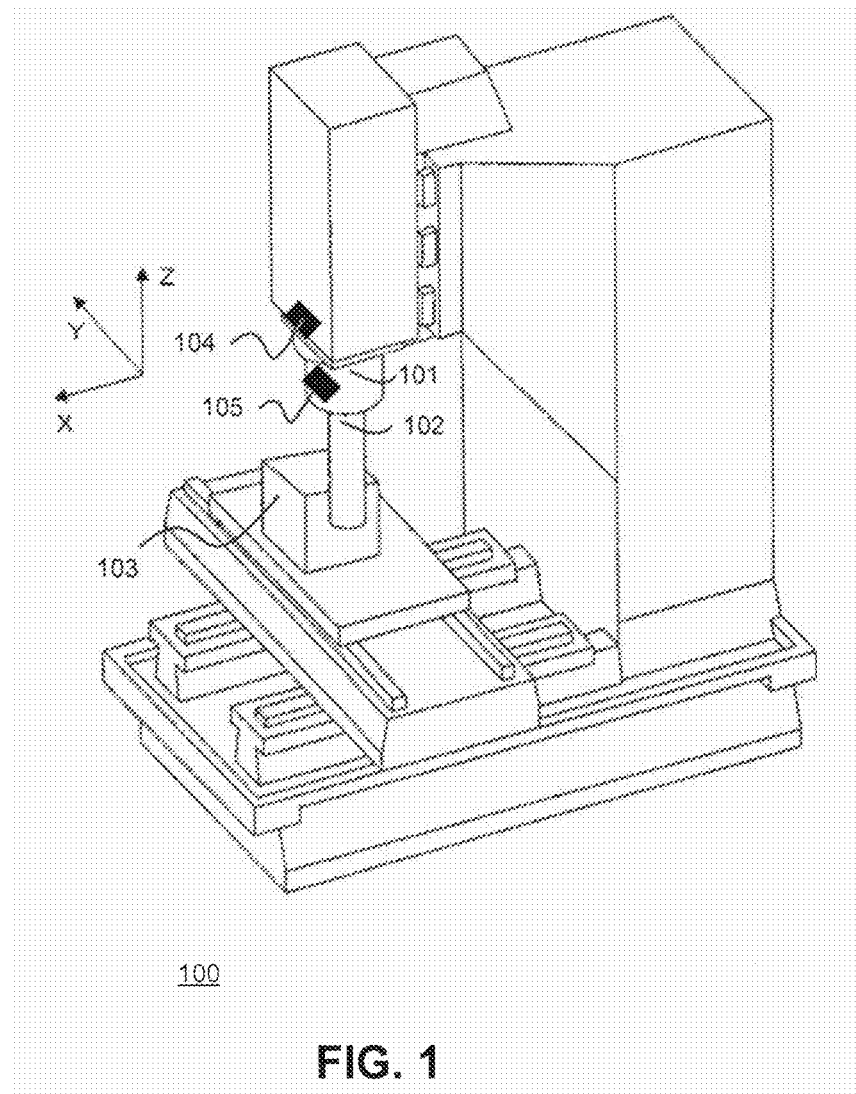
FIG. 1 depicts an exemplary machine tool that may generate chatter according to one embodiment.

In the drawings, like reference numerals designate identical or corresponding parts throughout the several views. Further, as used herein, the words "a", "an" and the like generally carry a meaning of "one or more", unless stated otherwise. The drawings are generally drawn to scale unless specified otherwise or illustrating schematic structures or flowcharts.

Furthermore, the terms "approximately," "proximate," "minor," and similar terms generally refer to ranges that include the identified value within a margin of 20%, 10% or preferably 5% in certain embodiments, and any values therebetween.

The terms "speed", "spindle speed", "selected speed" and similar terms refers to "tool rotation speed" in revolutions per minute (rpm) unless specified otherwise. However, embodiments of the present disclosure are not so limited and it is understood that other units of speed may be utilized.

Vibrations generated during a machining operation can be monitored using for example one or more sensors. The one or more sensors may be configured to directly or indirectly measure the vibrations during the machining operations. Sensor data received from the one or more sensors can be used to calculate chatter-reducing tool rotation speeds, for example using one or more methods to eliminate the phase difference between driving and driven vibrations. Based on the calculated speeds, chatter may be eliminated or reduced by manually or automatically changing a tool rotation speed to a selected calculated speed.

In certain embodiments, the machine is controlled by one or more computer numerical controls (CNCs). The tool rotation speed may be controlled by an operator (or user) via one or more user interfaces provided by the one or more CNCs or a separate computer. The user interface may be configured to display one or a combination of chatter data and chatter-reducing calculation results to guide users to activate one or more desired tool rotation speeds. However, in such a configuration, the speed data, chatter data, and activation method can be highly disconnected.

To address this issue, chatter history data can be integrated with corresponding speed information and provided to an operator. When trying multiple tool rotation speeds to find an optimal one, a history of tried speeds and each chatter magnitude can be saved and displayed to the operator. Such data may be displayed in the form of tables or graphs. However, due to screen size limitations, it may not be practical to concurrently show a full range of chatter data.

In order to more effectively reduce chatter during one or more machining operations, interfaces that facilitate selections of operating speeds based on past information is needed.

FIG. 1 depicts an exemplary machine 100 according to an embodiment of the present disclosure. The machine 100 comprises a spindle housing 101, a cutting tool 102 (e.g., a turning, boring, or milling tool), a work piece 103, and one or more sensors (e.g., vibration sensors 104 and 105). The spindle housing 101 contains fixtures to hold the cutting tool 102 in a desired position. The spindle housing 101 also contains a motor (not shown) capable of rotating the cutting tool 102 at a desired, selectable fixed speed. The cutting tool 102 rotates at a selected speed while contacting the work piece 103, to for example shape the work piece 103 by removing material. The movement of the cutting tool 102 and the work piece 103 is controlled through a computer 700 and/or operator actions.

Vibration sensors 104 and 105 are placed on the spindle housing 101 in different locations. A vibration sensor measures vibrations occurring during the machining process and provides vibration data to a control computer (e.g., the computer 700), where the vibration data is processed. The processed data may be displayed on a user interface with which an operator interacts to operate the machine 100. For instance, the vibration data may be used to calculate one or more optimum chatter reduction parameters such as speed which is/are displayed on the user interface. The one or more parameters act as a guide to the operator, who can then make appropriate selections on the user interface to reduce chatter observed during one or more machining operations.

Figure 2:
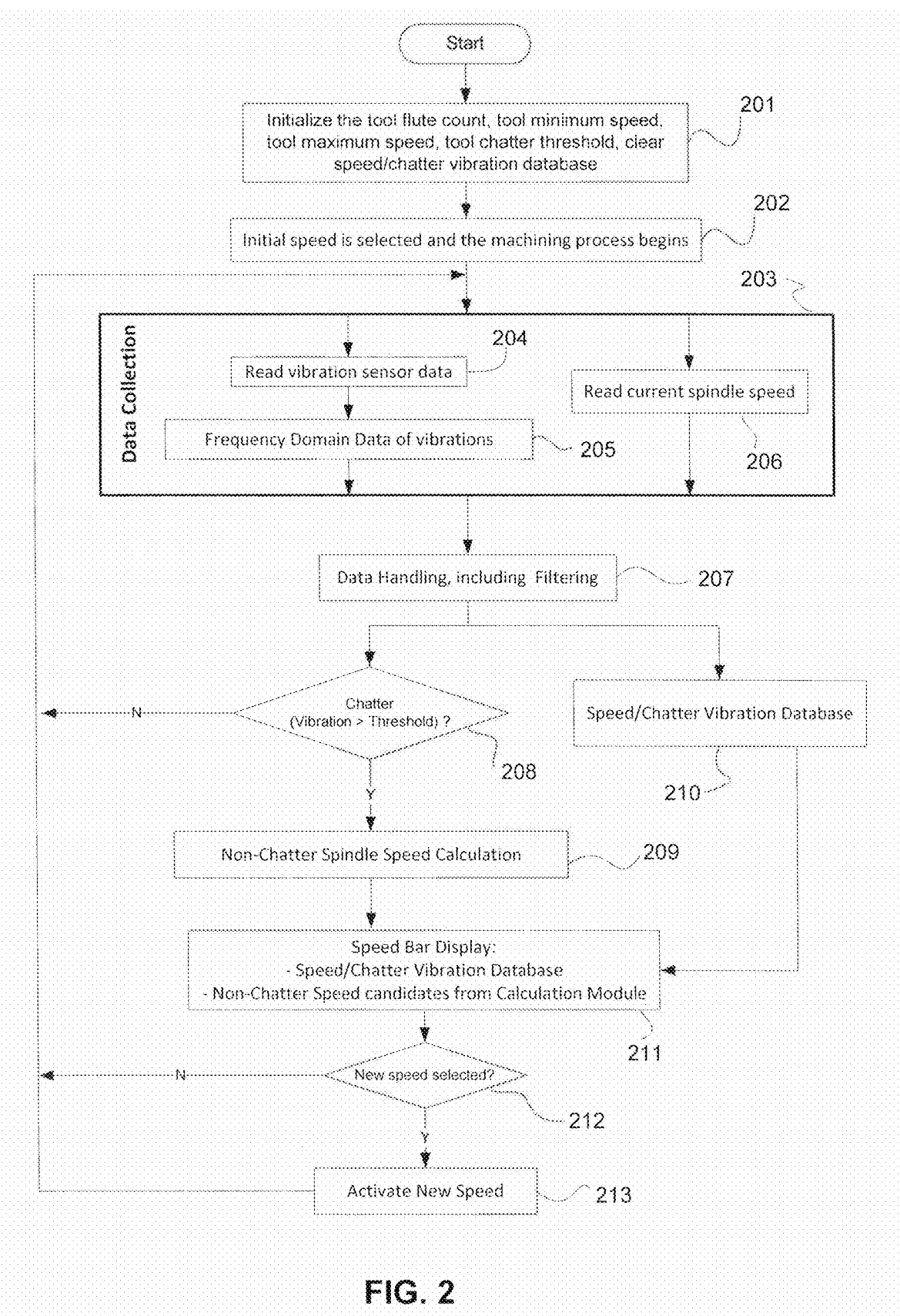
FIG. 2 depicts a flow chart of a method underlying a chatter application interface according to one embodiment.

FIG. 2 is a flow chart of a method underlying a chatter application interface (CAI) according to an embodiment of the present disclosure. The CAI process starts as soon as the machine 100 is switched on or an initialization process is otherwise started. An initialization step 201 involves initializing one or more machining related parameters such as tool flute count, tool minimum speed, tool maximum speed, tool chatter threshold, and/or clearing a speed and chatter vibration database. In step 202, an initial machining speed (or initial tool speed setting) is selected (automatically or by an operator) and the machining process begins. The data collection step 203 involves reading or collecting data during the machining process. For example, reading vibration sensor data in step 204 or reading a current spindle speed in step 206. Once the sensor data is collected, it can be converted into different forms. For instance, in step 205 the vibration sensor data is converted into frequency domain data using a Fast Fourier Transformation (FFT).

The data collection step 203 is followed by the data handling step 207. In the data handling step 207, the sensor data is processed as per the design specifications (e.g., chatter calculation). For example, vibration data from a plurality of sensors are processed in some way (e.g., averaged, weighted). The processing of the vibration data includes generating (e.g., by determining or measuring) a chatter level value and a chatter frequency value based on the vibration data. In one embodiment, the chatter level value corresponds to the maximum chatter level that is detected for that chatter frequency. The step 207 also involves data filtering algorithms that may be used to eliminate vibration data incidental to chatter as well as the noise in the sensor data.

After the data handling step 207, steps 208 and 210 are executed in parallel. Step 208 is a condition check that evaluates if the chatter vibration is greater than the tool chatter threshold that was set in step 201. If the condition is evaluated as false (N) in step 208, then the process returns to the step 203. If the condition is evaluated as true (Y) in step 208, then the process proceeds to step 209. In step 209, a non-chatter spindle speed calculation module (or a reduced chatter spindle speed calculation module) is utilized to calculate one or more candidate speeds, which is/are predicted to reduce or eliminate chatter. In one embodiment, the one or more candidate speeds are speeds for which chatter-levels are predicted to be lower than one or more predetermined chatter thresholds. The non-chatter spindle speed calculation module calculates the one or more candidate spindle speeds (or candidate tool speed settings) which are provided in a speed bar of the CAI.

Figure 4:
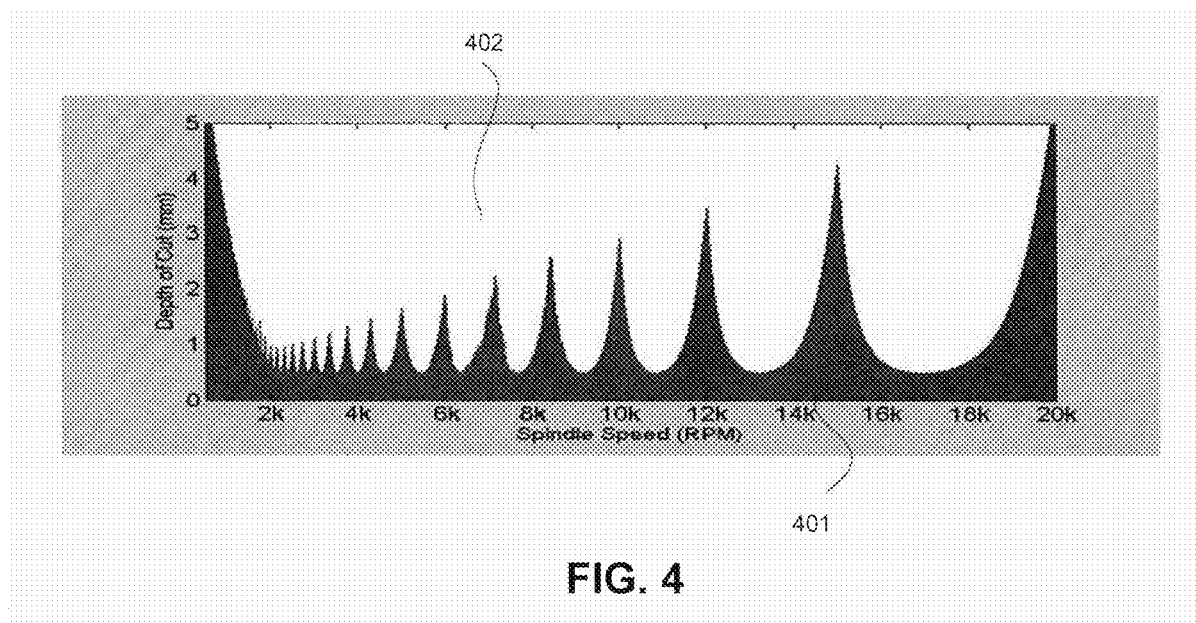
FIG. 4 depicts an exemplary stability lobe diagram.

In one embodiment, the non-chatter spindle speed calculation is based on the stability lobe determination method (an exemplary stability lobe diagram is illustrated in FIG. 4). However, it is noted that various different methods can be used to perform the calculation and the present embodiments are not limited to any particular calculation method. Various chatter reduction methods include the stability lobe method, time domain numerical modelling methods, analytical approaches that model tool dynamics, etc.

An example approach for the non-chatter spindle speed calculation involves using equation 1.

$$n_{stable\ speed} = \frac{f_{chatter} * 60}{N_{flutes} * i} \quad (1)$$

Where, $n_{stable\ speed}$ Stable (non-chatter) speed in revolutions per min (rpm) for each lobe.
$f_{chatter}$ Chatter frequency in hertz (Hz)
$N_{flutes}$ Total number of tool flutes
i Lobe numbers-1, 2, 3, etc.

The lobe numbers correspond to the whole number obtained from the ratio of base speed and observed speed. For a maximum speed the lobe number is at its minimum. For a minimum speed the lobe number is at its maximum. The lobe number equation 2 is as follows:

$$\text{lobe number, } i = \frac{\text{Base speed}}{\text{observed speed}} \quad (2)$$

Base speed is calculated using equation 3 as follows:

$$\text{Base speed} = \frac{f_{chatter} * 60}{N_{flutes}} \quad (3)$$

In step 210, the speed and chatter vibration data from step 207 is stored in one or more databases. The speed and chatter vibration data can be extracted on demand in other steps such as step 211. In certain embodiments, the one or more databases are also configured to store speed and chatter vibration data from one or more different past machining operations, for example involving a different workpiece but the same cutting tool. All or a subset of speed and chatter vibration data from the one or more different past machining operations may be stored in the one or more databases. The subset of speed and chatter vibration data may be selected based on one or more speeds associated with the lowest chatter vibration levels.

Figure 3A:
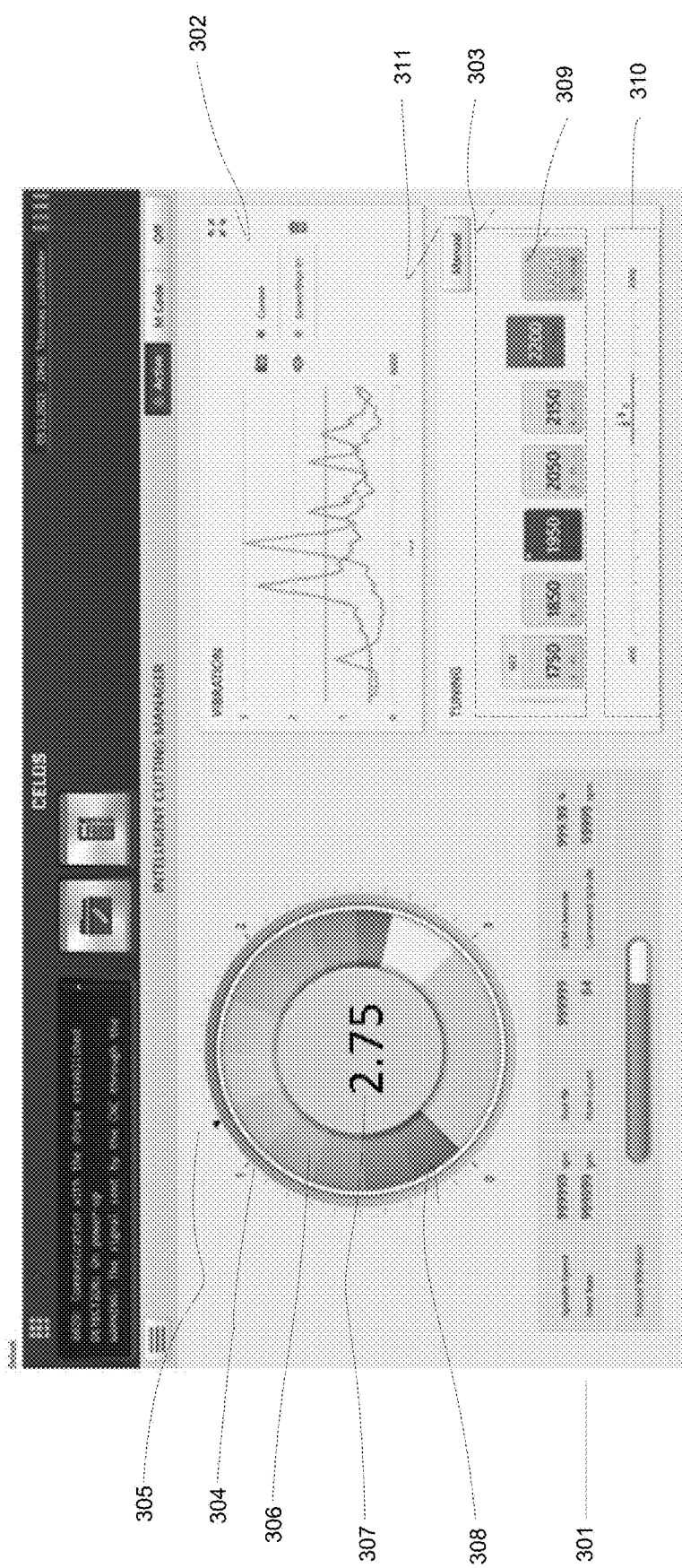
FIGS. 3A-3D depict a chatter application interface according to one embodiment.

In step 211, a speed bar display is generated. The speed bar is configured to display one or a combination of previously selected speeds (e.g., including an initial speed and/or one or more tried speeds) from the speed and the chatter vibration databases, and the candidate speeds calculated in step 209. An exemplary speed bar display is illustrated in FIG. 3A and its elements are further discussed below. The candidates speed options displayed in the speed bar may or may not be selected.

In step 212 a determination is made as to whether a new speed has been selected from among the speeds displayed in the speed bar. If a new speed is not selected, then the process returns to step 203. If a new speed is selected, then step 213 is executed and the new speed is activated. For a manual speed change, the new speed from the speed bar display may be selected by an operator using the CAI. However, speed changes may be selected automatically according to certain embodiments.

FIG. 3A is an exemplary illustration of a chatter application interface (CAI). FIG. 3C is a line drawing representation of FIG. 3A. The CAI includes one or more elements. For example, the CAI includes three elements such as a chatter gauge element 301, a vibration display element 302, and a tuning element 303. Each element displays information relevant to controlling the chatter levels during a machining operation.

The chatter gauge element 301, in this embodiment, is displayed as a circular dial 304 that comprises fixed gauge marks 308, an adjustable chatter threshold mark 305, a current chatter-level indicator 306, and a chatter level value 307. The fixed gauge marks 308 spread outside the circle and along the circumference of the circular dial 304. The main integer marks are 0, 1, 2, and 3, and each integer range is further subdivided into 10 equal parts thus enabling gauge measurement to a tenth of decimal point (e.g., 1.2 or 2.5). However, the chatter gauge element can be divided and subdivided into any other ranges. For example, the upper main integer range may be decreased or increased based on operator input or other factors. Further, each integer range can be subdivided into any of 0 or more parts based on operator input or other factors.

The adjustable chatter threshold mark 305 is positioned at a desired value along the fixed gauge marks 308. For instance, the adjustable chatter threshold mark 305 is placed at a value of 1.2 in FIG. 3A. The chatter level value 307 indicates the chatter level in a numerical form at the center of the circular dial 304 for better visibility, ease of interpretation and/or other benefits. In one embodiment, the threshold related data is initially populated from the initialization step 201 (FIG. 2). Further, the adjustable chatter threshold mark 305 may be adjusted by an operator at any time, for example in real-time, via a touch screen or other input device.

The current chatter-level indicator 306 indicates the real-time chatter that occurs during the machining operation. In one embodiment, the current chatter-level indicator 306 is color-coded and presented as a ring along the circumference of the circular dial 304 and next to the gauge marks 308. For example, on a 12 grade color scale, the colors may be evenly distributed for the chatter range indicated by the gauge marks. In another example, a greenish color gradation indicates that the chatter-level is below the chatter threshold value (e.g., 1.2), indicated by the adjustable chatter threshold mark 305. A yellowish color gradation indicates that the chatter-level is above the chatter threshold value (e.g., 1.2). A reddish color gradation indicates that the chatter-level is in an unacceptable range. Such an intuitive design of the chatter gauge allow easy interpretation, comparison of the current chatter-level against the desired chatter level, and other added advantages. The chatter level data is populated from the data collection step 203 (FIG. 2) discussed earlier in this embodiment. In other embodiments, the chatter level data may be received separately from the data collection step 203 to allow for more frequent updates.

Although a specific embodiment of the chatter gauge element 301 is described above with respect to FIG. 3A, it is noted that the chatter gauge element 301 may be designed in different shapes and patterns in other embodiments. For example, a horizontal or vertical dial instead of a circular dial could be designed. A chatter-level may be represented in several ways too. For example, the horizontal or vertical dial may include a color coding scheme based on the chatter level. A moving pointer may be included in the dial instead of a moving band of color representing the current chatter level. The chatter gauge element 301 may include any one or a combination of the chatter threshold mark 305, current chatter-level indicator 306, chatter level value 307, and fixed gauge marks 308.

Further, in certain embodiments, more than one chatter gauge element is provided in the CAI, for example one chatter gauge for each vibration sensor installed on the machine spindle. A multiple chatter gauge design may also allow detection of faulty vibration sensors, thus allowing an operator to ignore any faulty data that may lead to more chatter.

Referring to FIG. 3A, the vibration display element 302 displays real-time vibration data plotted along the frequency-magnitude axis. Past vibration data is optionally plotted along the frequency-magnitude axis. The real-time vibration data may be populated from the data collection step 203 (FIG. 2) or via a separate path from the one or more sensors. The past vibration data is extracted from the speed and the vibration databases, which were populated in step 210 (FIG. 2) or stored on demand when requested by user. The vibration display element 302 provides a reference to the operator for making one or more speed selections from the tuning element 303. In one embodiment, the past vibration data corresponds to data that was captured during a machining operation in response to an instruction from the operator.

The vibration display section 302 may be designed in different shapes and patterns in other embodiments. For example, a vibration graph may be presented in different graph types such as line graph, discrete graph with dots, bar graph, tabular data, etc. Further, a plurality of past vibration data may be plotted along with the real-time vibration data. Any plotted past vibration data may be selected by a user or automatically selected by the computer. For example, the computer may be configured to automatically display past vibration data from one or more immediately preceding speed settings or closest speed settings.

The tuning section 303 comprises a speed bar 309, a history bar 310, and a mode indicator 311 according to one embodiment. If chatter has been detected, e.g., chatter level is greater than the predetermined chatter threshold, then the candidate speed calculation of step 209 is performed and the speed bar 309 displays one or more selectable candidate speeds for a machining operation. The candidate speeds in the speed bar 309 are populated from the speed bar display step 211 (FIG. 2).

The history bar 310 displays history data associated with previously selected and current selected speeds along a speed axis. The history data is extracted from the speed and the chatter databases, which were populated in step 210 (FIG. 2). The history bar 310 serves as a guide to select the candidate speeds from the speed bar 309.

The mode indicator 311 indicates whether the system operates in manual or automatic mode. In this illustration, the manual mode is active, which means an operator input is expected for chatter-reduction control. In the automatic mode, there is no operator input. However, the user interface may perform the same displays as if it were operating in the manual mode. In one embodiment, an operator selects the mode indicator 311 to toggle between the manual and automatic modes.

Figure 3B:
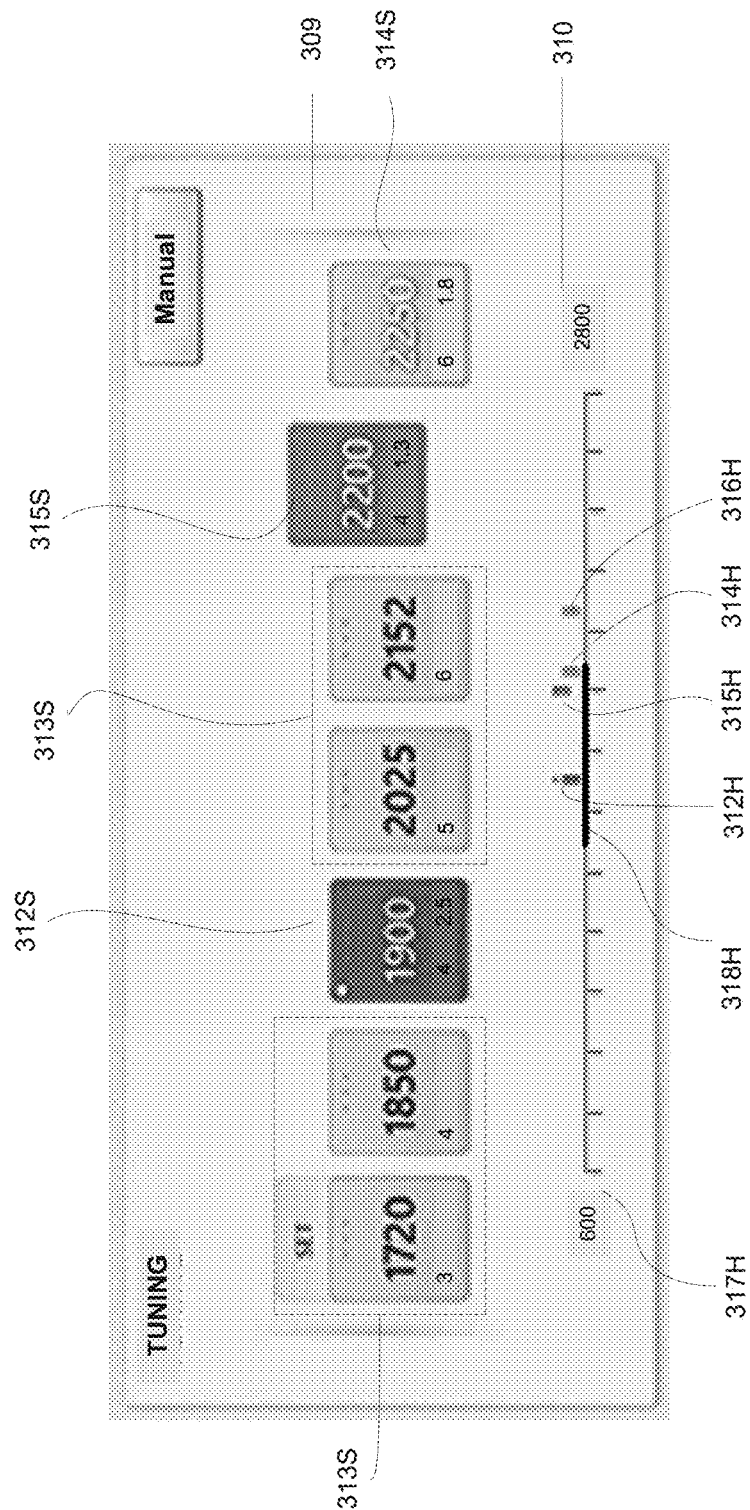
Figure 3C:
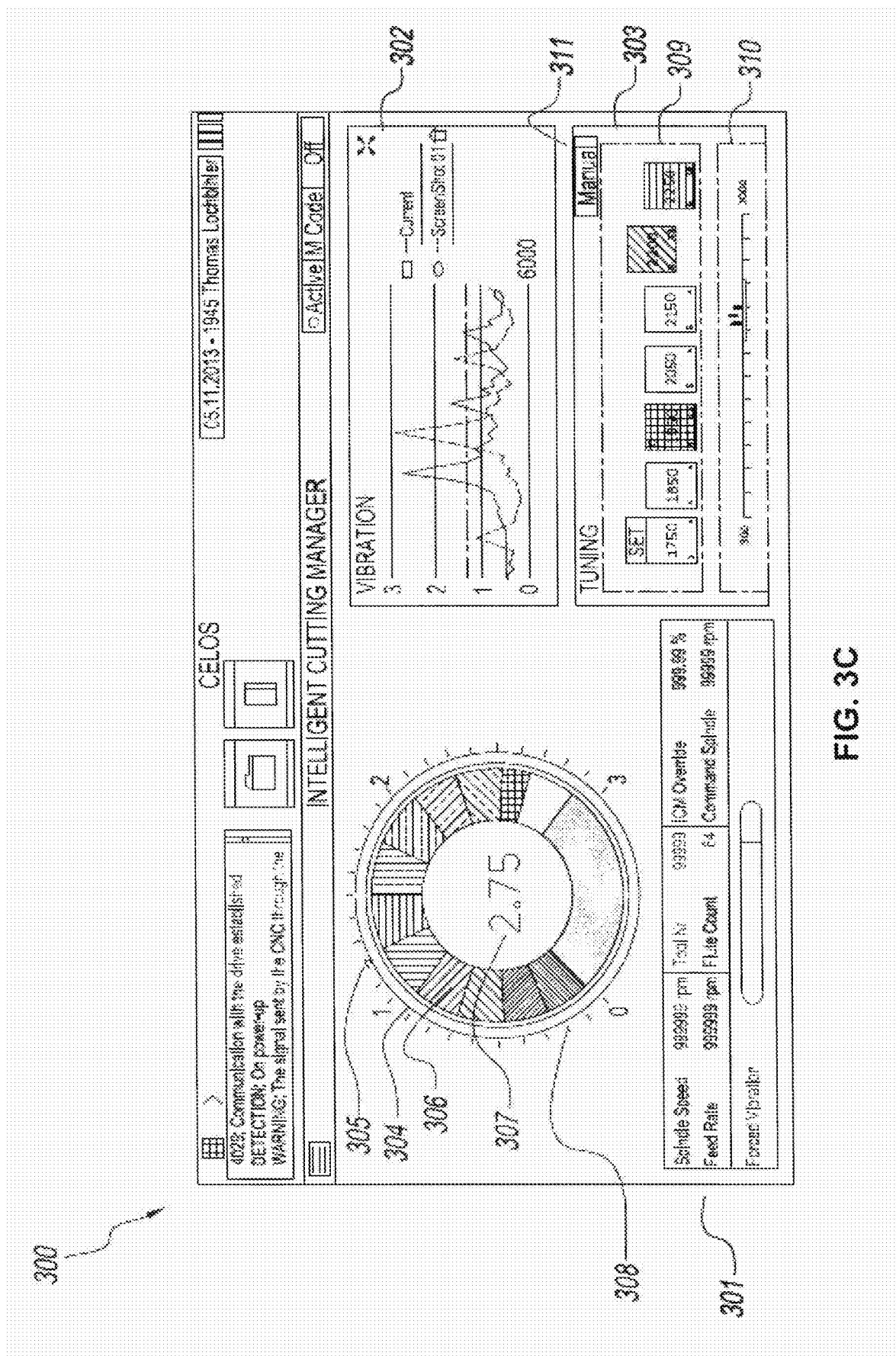
Figure 3D:
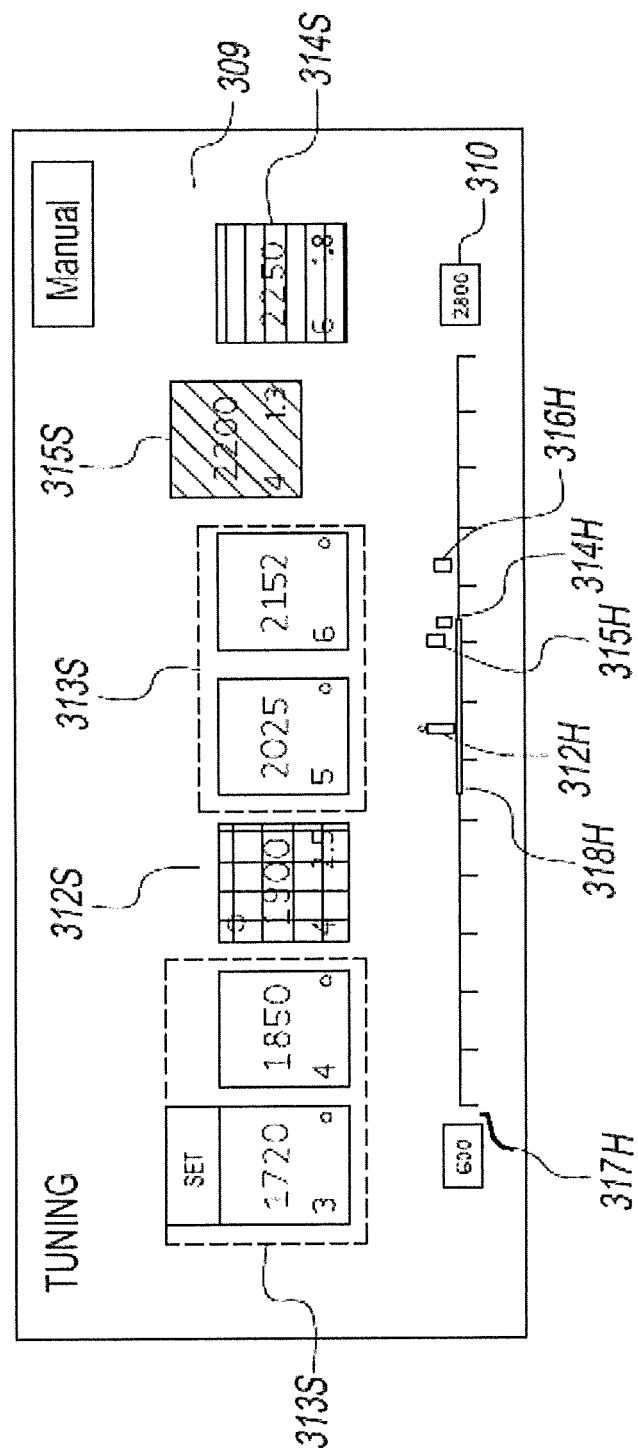

The speed bar 309 and the history bar 310 are further illustrated in detail in FIG. 3B. FIG. 3D is a line drawing representation of FIG. 3B. FIG. 3B is an exemplary implementation of the tuning section 303 comprising the speed bar 309 and the history bar 310. The speed bar 309, in this illustration, comprises more than one rectangular shaped buttons, which are selectable by an operator via a touch screen or other input device. Each of these buttons simultaneously displays the speed in the center, the lobe number in the lower left corner, and chatter level data (if available) in the lower right corner of the rectangle. These buttons and the corresponding data can be dynamically populated based on step 211 of FIG. 2. Further, the buttons can be categorized into different types. For example, an initial speed button 312S, a candidate speed button 313S, a previously selected speed button 314S and a currently selected speed button 315S.

The initial speed button 312S corresponds to the initial speed that was set in step 202 (FIG. 2) along with its corresponding vibration data. The initial speed button 312S can be distinguished in multiple ways. For example, a dot is placed in the top left corner of the rectangle. The speed bar contains only one initial speed button.

Each candidate speed button 313S indicates a different candidate speed that is calculated in step 209 of FIG. 2. The candidate speed button 313S can be distinguished in multiple ways. For example, the candidate speed button 313S is gray in color and also displays the lobe number along with the speed. Because the candidate speed button 313S is associated with a speed that has not been selected, vibration data for display, i.e. chatter level, is not available. The speed bar 309 optionally includes a scroll feature to allow an operator to navigate to portions of the speed bar 309 that are not displayed in the CAI. The scrolling functionality may be provided by dedicated scrolling buttons, a scroll bar, or based on recognizing gestures such as a swipe. In this case, horizontal scrolling is possible. However, the scrolling direction may vary depending on the orientation of the speed bar 309. For instance, for a vertically oriented speed bar, vertical scrolling may be implemented. Further, one or more of the candidate speeds can be activated in different ways. For example in this embodiment, the operator selects a desired speed by holding and dragging one of the candidate speed buttons 313S upward via a touch screen or other input device. The direction of dragging is indicated by the SET marker above the candidate speed button 313S. The operator can cancel the initiated speed selection by dragging the candidate speed button back to its original down position.

The previously selected speed button 314S indicates a speed that was previously selected by the operator and activated on the machine. In one embodiment, the previously selected speed button 314S may also correspond to an automatically selected speed. The previously selected speed button 314S contains information extracted from the speed and the chatter databases, which were populated in step 210 of FIG. 2. The previously selected speed button 314S can be distinguished in multiple ways. For example, the previously selected speed button 314S is color-coded according to the chatter-level observed. The color coding scheme may be the same as the chatter-level 306 of the chatter gauge element 301. One or more previously selected speed buttons 314S may be included in the speed bar 309.

The currently selected speed button 315S indicates a currently selected and active speed for a machining operation. The currently selected speed button 315S contains information obtained from the data collection step 203 of FIG. 2. The currently selected speed button 315S can be distinguished in multiple ways. For example, the button is placed in a raised position in FIG. 3B.

When an operator activates one of the candidate speed buttons 313S, the activated candidate speed button becomes the currently selected speed button 315 s. The previous currently selected speed button 315S automatically goes down and becomes a previously selected speed button 314S. This change is updated in steps 212 and 213 of FIG. 2 for example.

The speed bar 309 in other embodiments may be designed in one or more different ways. The speed buttons could be of a different shape, size, pattern or a combination thereof. For example, the buttons could be circular, triangular, or polygon shaped. The initial button's distinguishing feature could be that it is smaller than the other buttons or triangular shaped while others are circular shaped. The currently selected speed button could be larger than the other button or of a different shape than the other buttons.

Other than the appearance, a different speed activation method could be adopted. For example, in case of a touch screen, instead of holding and dragging a button upwards, the desired speed may be activated by multiple taps, holding and dragging a button in one or more predetermined directions (e.g., sideways), etc. In case of an analog implementation, switches or rotating dials may be provided to activate a desired speed. The interface may also be a combination of digital and analog parts.

Referring to FIG. 3B, the speed bar 309 is associated with the history bar 310. The history bar 310 is non-interactive and serves as a guide to select the candidate speeds from the speed bar 309 in one embodiment. The history bar 310 displays the past and the current speed data along with vibration data over the entire operating range of tool speeds (e.g., as set by an operator or operating range of the machine). It does not display candidate speed values as shown in speed bar 309. In another embodiment, one or more of the candidate speed values are optionally displayed on the history bar 310.

The history bar 310 comprises an operating speed scale 317H, a speed bar range indicator 318H, and various types of speed markings 312H, 314H, 315H, and 316H. The operating speed scale 317H ranges from the tool minimum speed (600 in this case) to the tool maximum speed (2800 in this case). The tool minimum and maximum speeds may be provided during the initialization step 201 (FIG. 2) and may vary. The speed bar range indicator 318H correlates the history bar 310 and the speed bar 309. The speed bar 309 typically has a limited screen size, as such it commonly cannot simultaneously display the current operating speed, all past speeds and candidate speeds in their entirety. The speed bar range indicator 318H is designed to indicate the range of speeds displayed in the speed bar 309. In this case the speed range bar indicator 318H, starts at 1720 rpm and ends at 2250 rpm.

Above the operating speed scale 317 H are the speed markings 312H, 314H, 315H, and 316H that can be categorized into initial speed, current speed, and tried speed. These speed markings 312H, 314H, 315H, and 316H correspond to the speed buttons in the speed bar. The initial speed mark 312H can be distinguished by one or more additional markings such as a dot above the initial speed mark 312H. The initial speed mark 312H may also be color coded in the same way as initial speed button 312S in the speed bar 309. The current speed mark 315H may be distinguished in the same way as the currently selected speed button 315S in speed bar 309. Also it may be color coded in the same way as the current speed button 315S. The tried speed marks 314H and 316H are color coded similar to the previously selected speed button 314S. Observe that the tried speed mark 314H corresponds to the previously selected speed button 314S in speed bar 309. However, the tried speed mark 316H is not displayed in the speed bar, since it is outside the speed bar indicator range 318H.

An alternate history bar may be designed in several ways. The speed marks could be represented by a different shape, size, pattern or a combination thereof. For example, the marks could be circular, triangular, or polygon shaped. The initial speed's distinguishing feature could be, for example, that it is smaller than the others or triangular shaped while others are circular shaped. The currently selected speed could be, for example, larger than the other button or of different shape than others. Further, in certain embodiments, the history bar 310 may be configured to allow a user to more quickly navigate to different portions of the speed bar 309. For example, the history bar 310 may be configured to provide for rapid scrolling and/or to allow an operator to jump to a specified sub-range of the speed bar 309 via a touch screen or other input device.

FIG. 4 is an exemplary stability lobe diagram that is used to calculate candidate speeds. The graph is drawn on a depth of cut vs. spindle speed axis. The shaded region 401 is a stable speed region suitable for chatter reduction. When a machining operation is performed at a speed that falls in the non-shaded region 402, excessive chatter results. The peak of the shaded region implies maximum material is removed for a particular speed with acceptable to no chatter.

Figure 5:
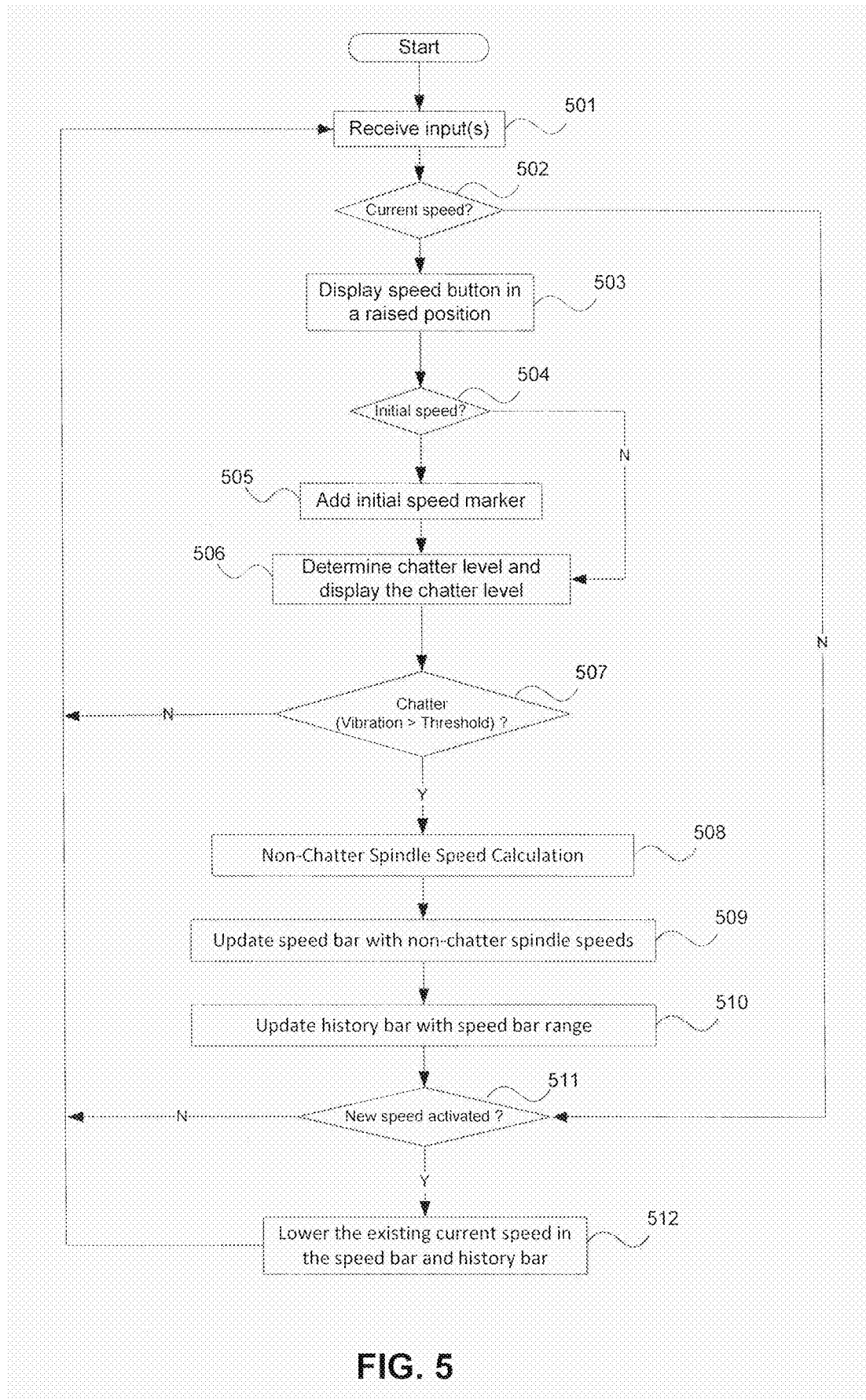
FIG. 5 depicts a flow chart of a method related to a speed bar and a history bar included in a chatter application interface according to one embodiment.

FIG. 5 is a flowchart of a process performed by the tuning element 303 according to one embodiment. In the first step 501, one or more inputs such as initial speed, current speed, non-chatter speed(s), past chatter-level, etc. are received. In step 502, if the current speed is available, the corresponding speed button in the speed bar and the history bar are displayed in a raised position, in step 503. In step 504, if one of the speeds received is an initial speed an initial speed marker is added to the corresponding speed, in step 505. In step 506, a chatter-level is determined for the current speed, step 501. If the chatter is greater than a predetermined chatter threshold, then, in step 508, the non-chatter spindle speed calculation module is executed which calculates candidate speeds based on for example equations 1-3, as discussed above. The candidate speeds are updated in the speed bar, in step 509. The update includes generating new non-chatter (or chatter-reducing or candidate) speed buttons or replacing existing non-chatter speed buttons. Further the speed bar range of the history bar is optionally updated, if necessary, in step 510. One of the non-chatter speeds displayed in the speed bar may be activated, for instance by an operator action. If a new speed is activated, in step 511, then the existing current speed position is lowered in the speed bar and the history bar, in step 512 and the process returns to step 501. The new input is received in the step 501, which is the new current speed. The process continues as discussed earlier.

Figure 6A:
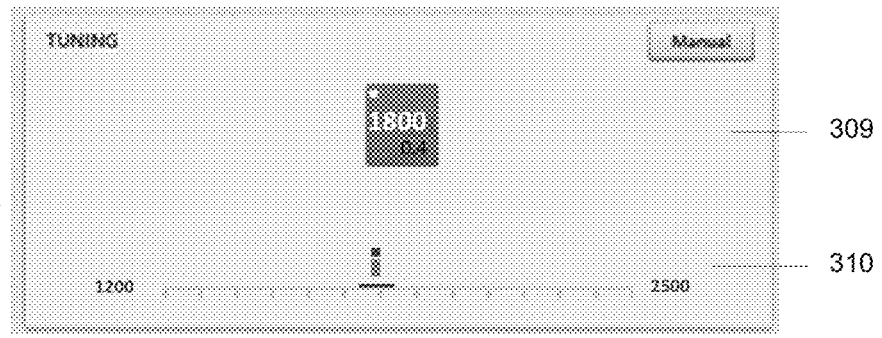
FIGS. 6A-6H depict exemplary screens of the chatter application interface according to one embodiment.

FIGS. 6A-6D, are exemplary speed and history bar screens which are displayed for example in response to one or more inputs from an operator. FIGS. 6E-6H are line drawing representations of FIGS. 6A-6D, respectively. Referring to FIG. 6A, an initial tool rotation speed of 1800 rpm is chosen. The tool is rotated at this speed for a predetermined machining operation. The initial speed is also the current speed in this case; hence speed 1800 is in a raised position. During the machining operation a chatter level of 0.4 was observed, which is below the set threshold of 1.2. Since the chatter-level 0.4 is below the threshold value 1.2, in one embodiment, one or more non-chatter speed calculations are not performed, hence no candidate speeds are displayed on speed bar 309.

Figure 6B:
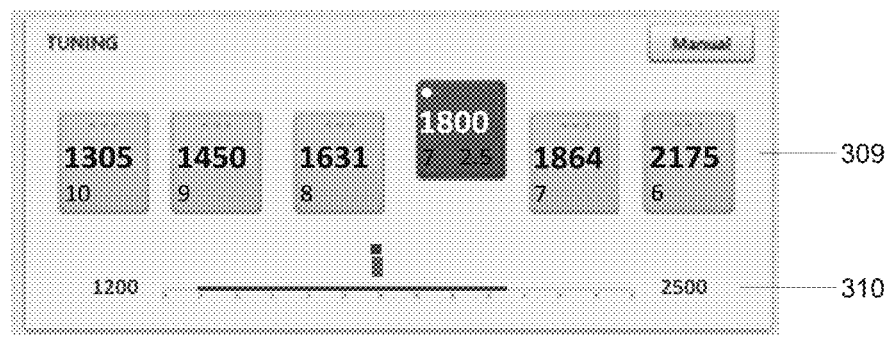

Referring to FIG. 6B, an initial speed of 1800 rpm was chosen. The initial speed is also the current speed in this case; hence speed 1800 is in a raised position. While performing a machining operation at this speed, a chatter frequency of 870 Hz and a chatter-level of 2.5 was observed. Since the chatter-level is significantly above the chatter threshold of 1.2, one or more non-chatter speed calculations are performed. Sample results of the non-chatter speed calculation using equations 1-3 are presented in the table 1 below.

TABLE 1

Sample non-chatter speed calculations

| Speed | Flute | | |
|---|---|---|---|
| 1800 | 4 | | |
| Chatter Frequency | Base Speed | Min Lobe No. | Max Lobe No. |
| 870 | 13050 | 5 | 11 |
| Lobe No. | Min Speed | | Max Speed |
| 7 | 1200 | | 2500 |
| Stable Speed Lobe No | | Stable Speeds | |
| 11 | | < Min Speed | |
| 10 | | 1305 | |
| 9 | | 1450 | |
| 8 | | 1631 | |
| 7 | | 1864 | |
| 6 | | 2175 | |
| 5 | | > Max Speed | |

Figure 6C:
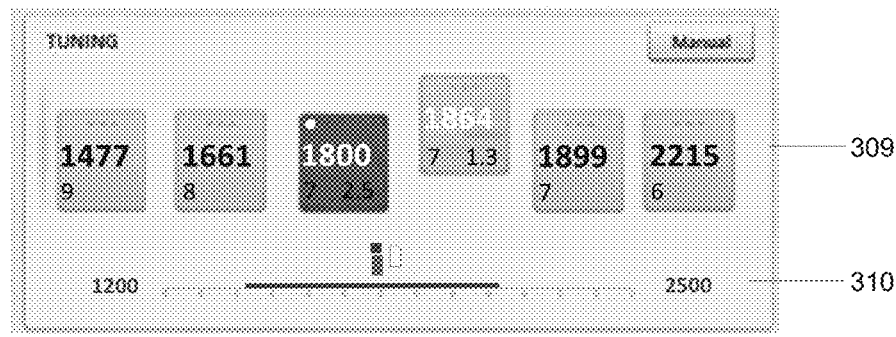

The calculated non-chatter (or stable) speeds are displayed on speed bar 309 in gray along with corresponding lobe numbers. The operator decides to activate the speed 1864 rpm, which becomes the new current speed. FIG. 6C shows the speed 1864 rpm was activated and the corresponding chatter level calculated is 1.3, which is greater than the chatter threshold of 1.2, and a corresponding chatter frequency is obtained. So non-chatter speeds are recalculated by the system (e.g., according to the process in FIG. 2). The unused previous non-chatter speeds are removed from speed bar 309 and updated with recalculated speeds. In other embodiments, one or more of the previously calculated non-chatter speeds are maintained. Further, in certain embodiments, non-chatter speeds are calculated based on history information (e.g., vibration data, chatter level, chatter frequency) associated with a plurality of tried speeds.

Figure 6D:
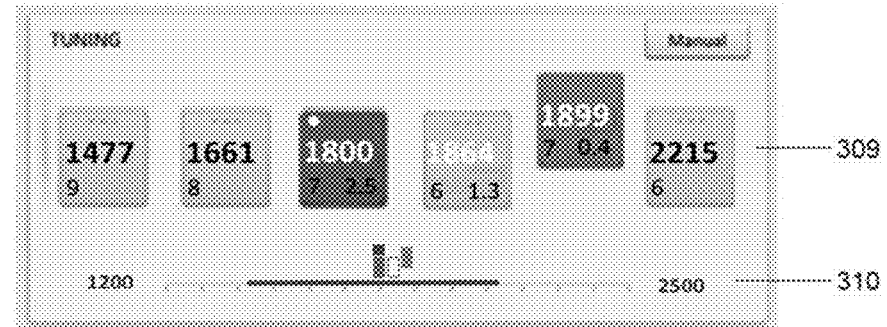
Figure 6E:
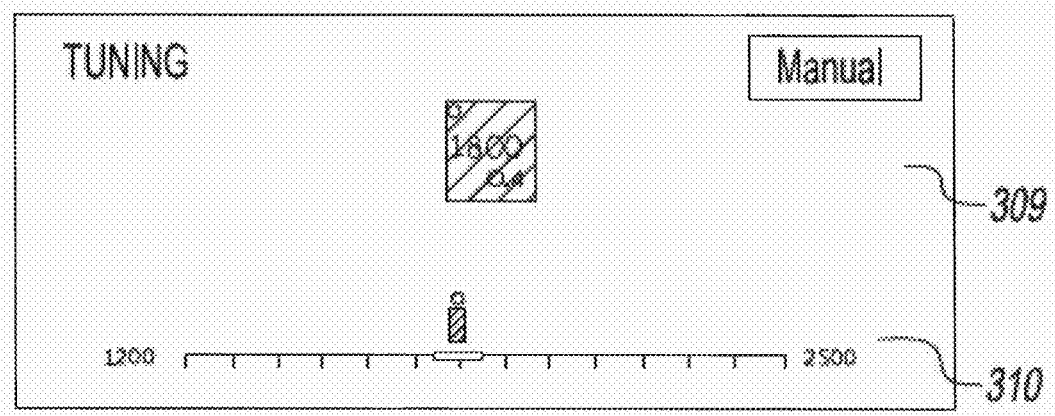
Figure 6F:
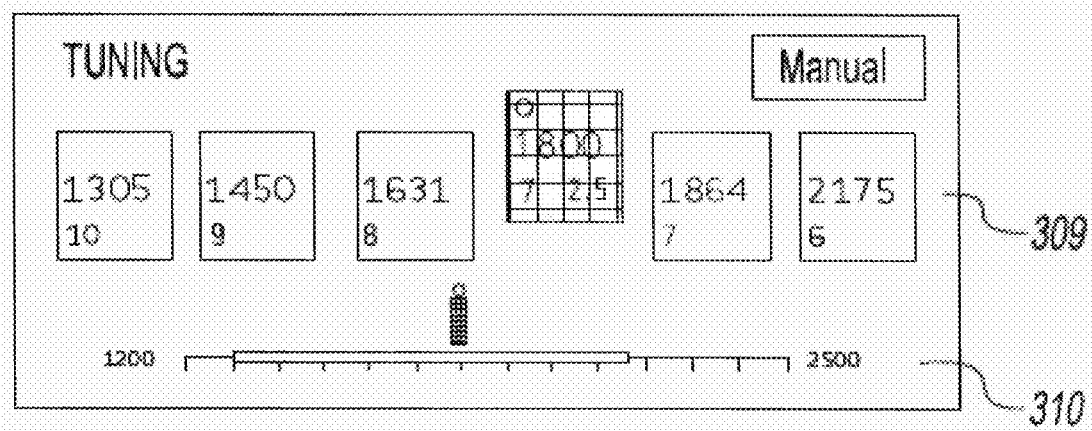
Figure 6G:
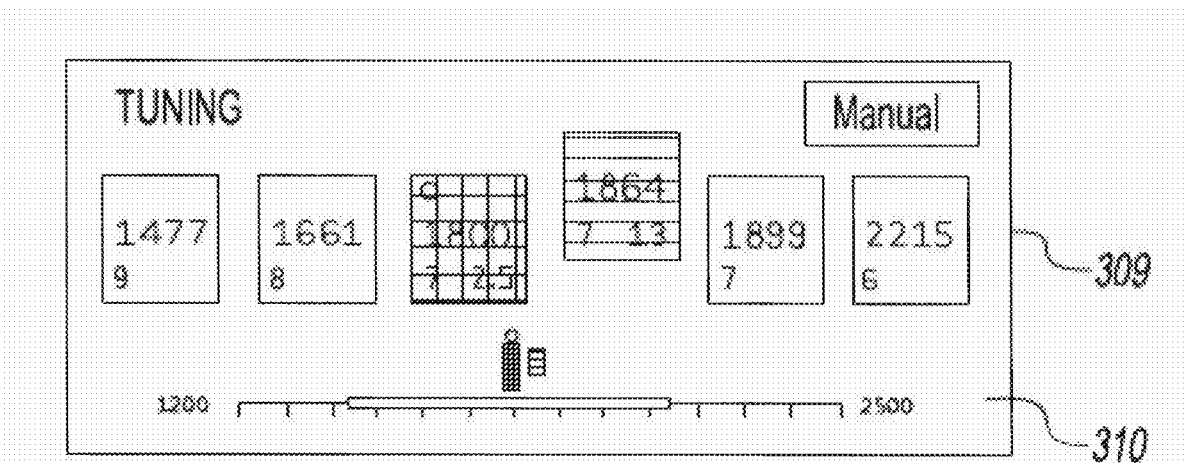
Figure 6H:
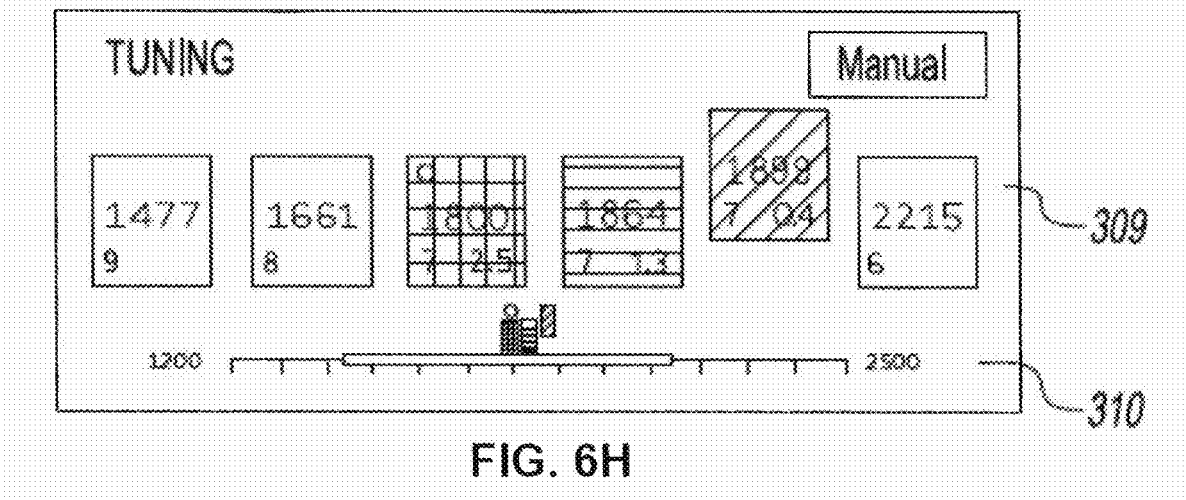

The updated speeds are displayed on the speed bar 309. The operator decides to activate the speed 1899, which is done by selecting the speed, dragging it upwards and releasing it. FIG. 6D shows the speed 1899 rpm was activated and the corresponding chatter level calculated was 0.4, which is less than the chatter threshold of 1.2. Since the chatter-level is below threshold, new non-chatter speeds are not calculated. The other candidate speed buttons remain in their respective positions, even though they are not necessary, in case the user wants to investigate other possibly good speeds. In another embodiment, new non-chatter speeds are calculated to allow an operator or the system to identify other desired or more optimal speeds.

Figure 7:
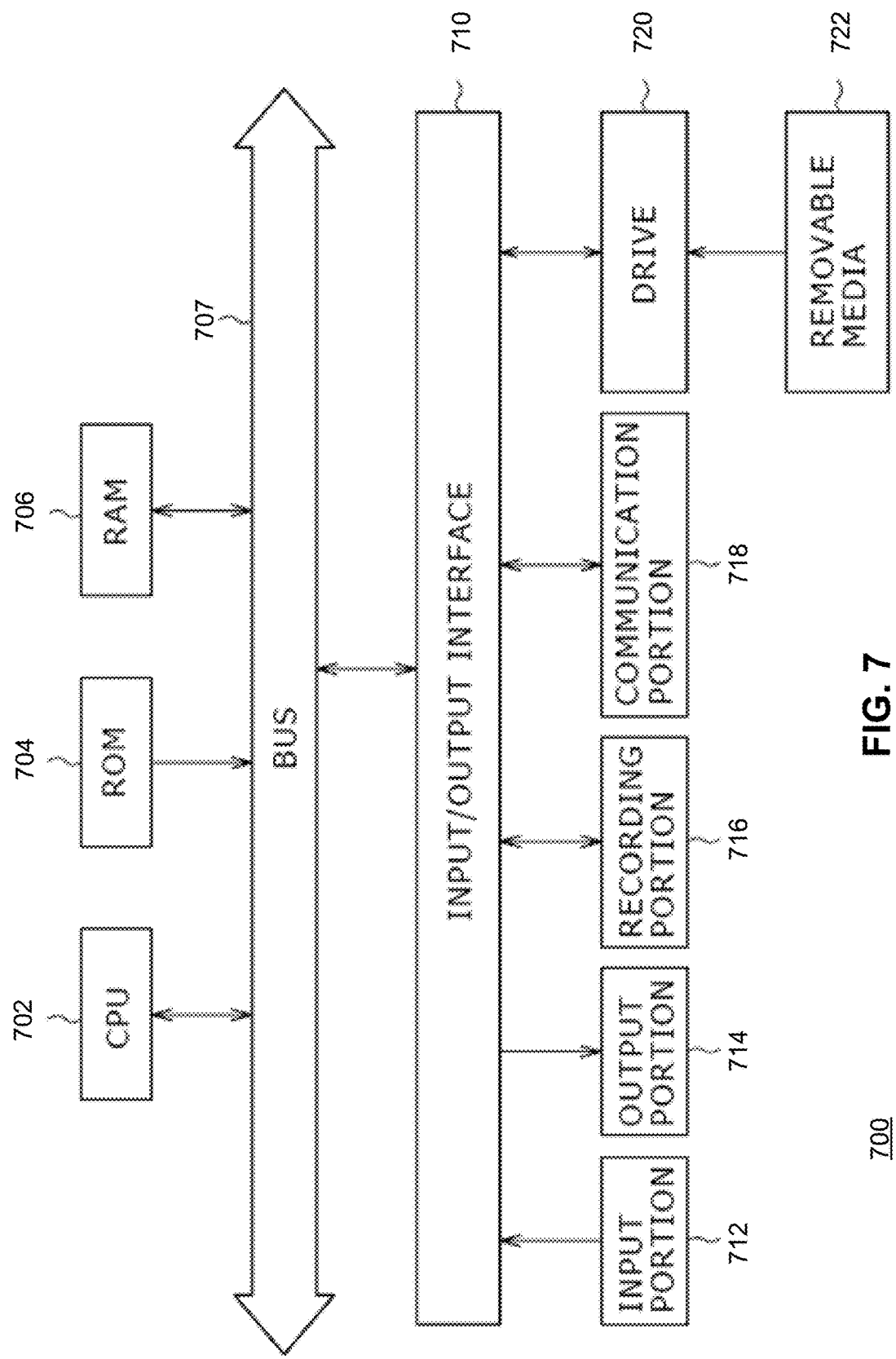
FIG. 7 depicts a block diagram showing an example of a hardware configuration of a computer.

FIG. 7 is a block diagram showing an example of a hardware configuration of a computer 700 that is configured to implement one or more of the various processes described above. For example, in certain embodiments, the computer 700 is configured to control the machine and/or to provide the CAI, including one or a combination of a chatter gauge element 301, a speed bar 309, a history bar 310, a vibration display element 302, and a speed database and a chatter database.

As illustrated in FIG. 7, the computer 700 includes a central processing unit (CPU) 702, read only memory (ROM) 704, and a random access memory (RAM) 706 interconnected to each other via one or more buses 707. The one or more buses 707 is further connected with an input-output interface 710. The input-output interface 710 is connected with an input portion 712 formed by a keyboard, a mouse, a microphone, remote controller, touch screen, etc. The input-output interface 710 is also connected to sensors like vibration sensors 105 and 106, via the input portion 712 or communication portion 718 for example. The input-output interface 710 is also connected to an output portion 714 formed by an audio interface, video interface (e.g., to output for example displays like the chatter gauge element 301, speed bar 309, history bar 310, and vibration display element 302), speaker, etc.; a recording portion 716 formed by a hard disk, a non-volatile memory, database etc.; a communication portion 718 formed by a network interface, modem, USB interface, fire wire interface, etc.; and a drive 720 for driving removable media 722 such as a magnetic disk, an optical disk, a magneto-optical disk, a semiconductor memory, etc.

According to one embodiment, the CPU 702 loads a program stored in the recording portion 716 into the RAM 706 via the input-output interface 710 and the bus 707, and then executes a program configured to implement the present disclosure such as providing the functionality of the one or combination of the elements of the CAI 300. The recording portion 716 is for example a non-transitory computer-readable storage medium. It is noted that the term "non-transitory" is a limitation of the medium itself (i.e., tangible, not a signal) as opposed to a limitation on data storage persistency (e.g., RAM vs. ROM).

Figure 8:
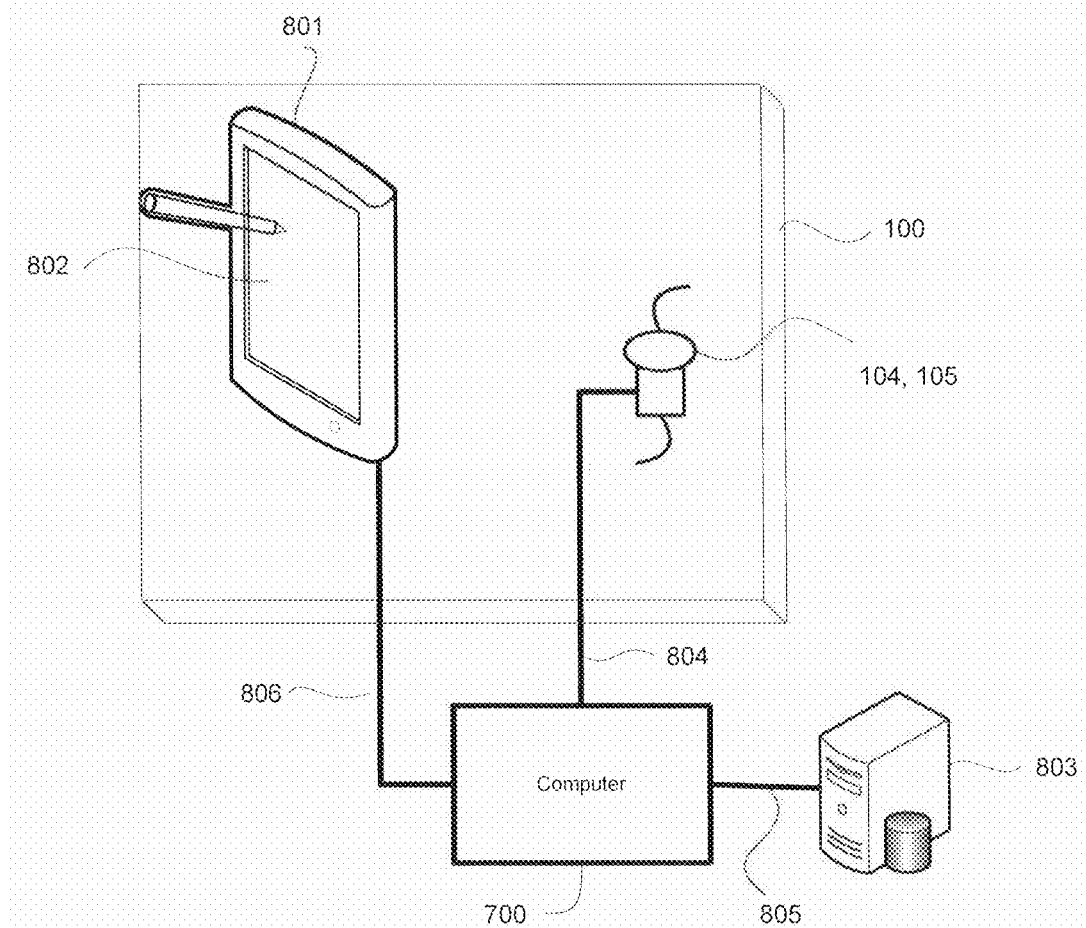
FIG. 8 depicts a system for implementing a chatter application interface according to one embodiment.
Figure 9A:
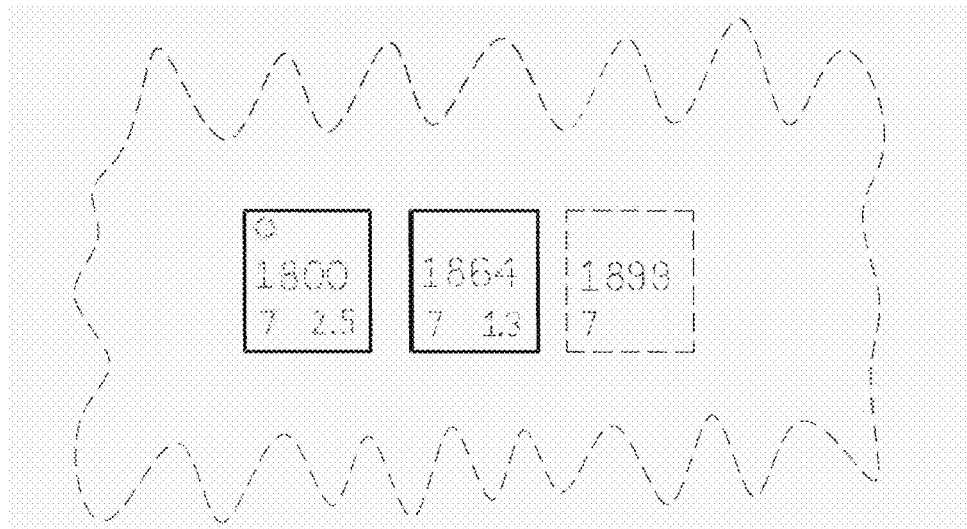
FIGS. 9A-9F each show an exemplary graphical user interface that is embodied in a portion of a computer screen, monitor, or other display panel.
Figure 9B:
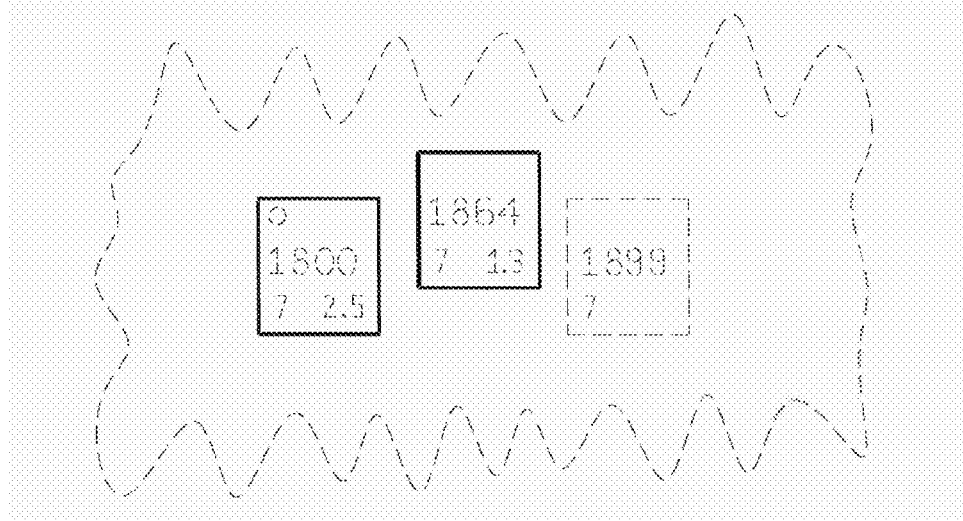
Figure 9C:
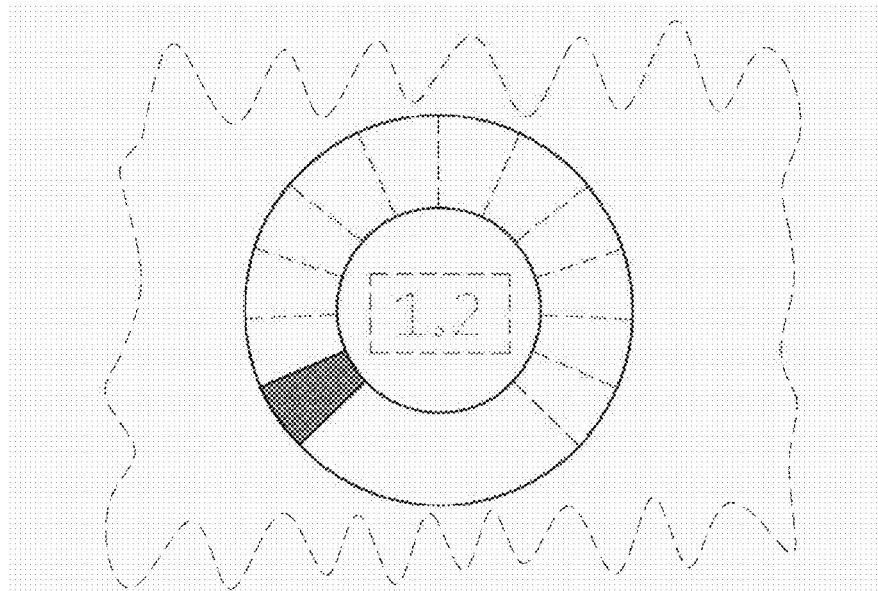
Figure 9D:
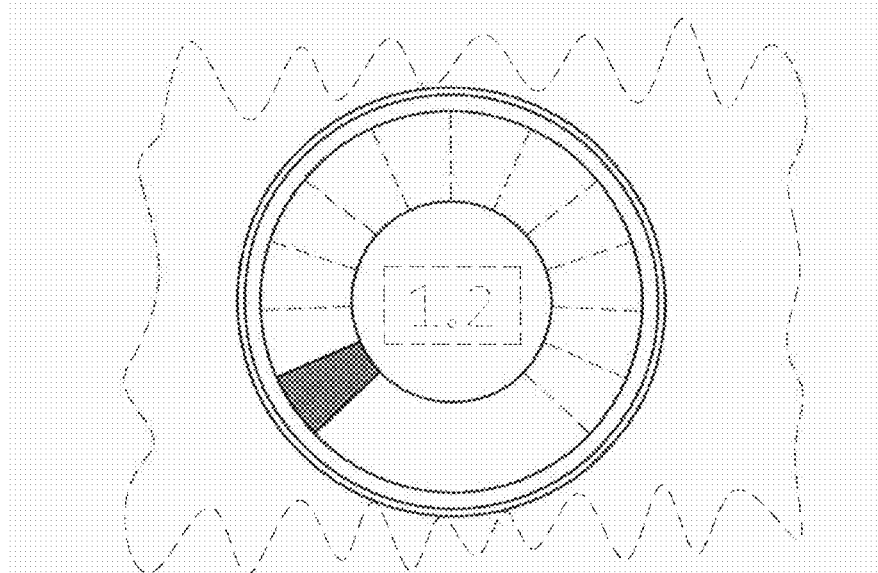
Figure 9E:
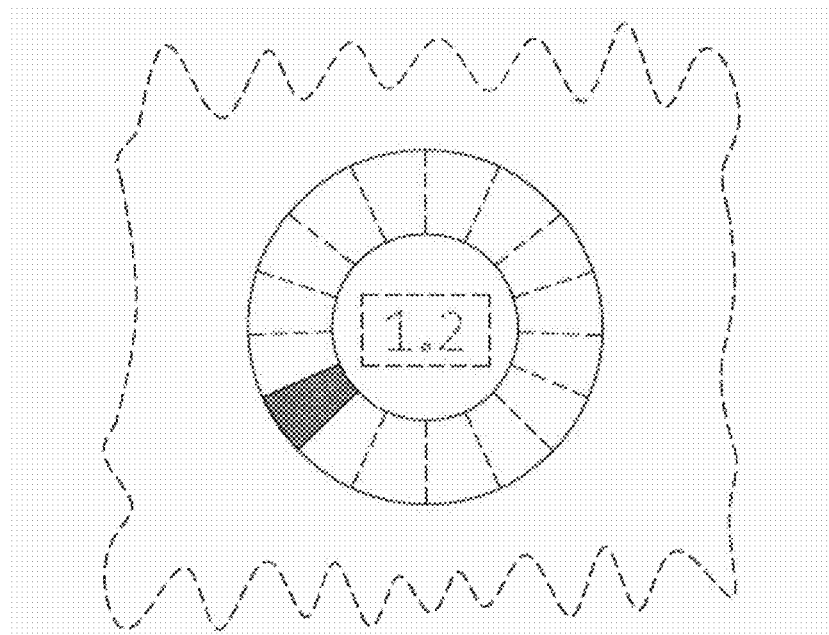
Figure 9F:
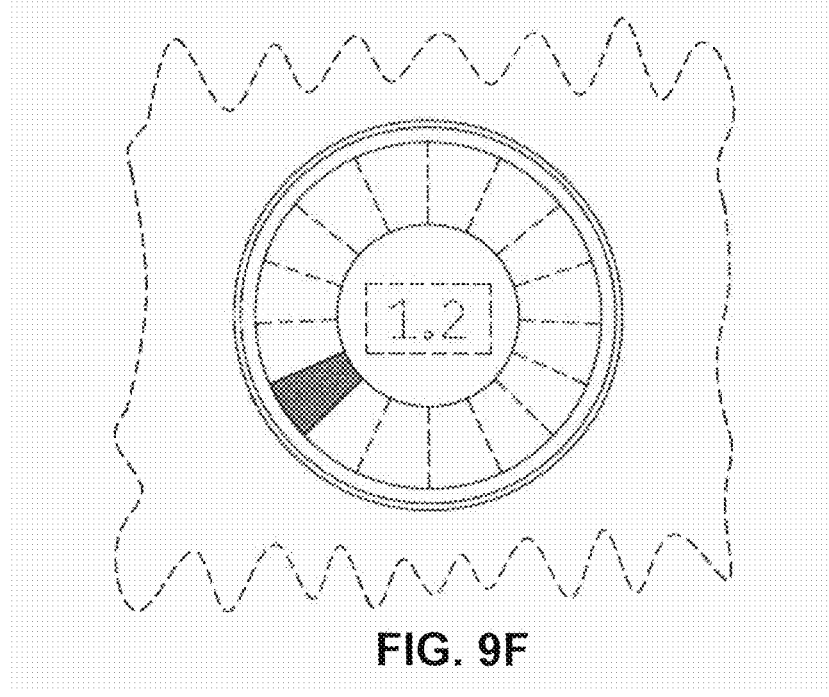

FIG. 8 is an exemplary system for implementing the chatter application interface of the machine 100 discussed above. For example, the flowcharts illustrated in FIGS. 2 and 5 may be implemented by the computer 700. The interface is displayed on a device 801, which includes a touch screen 802. The device 801 communicates with the computer 700, which processes the information received from device 801, and also information sent to the device 801, via a communication link 806, which interfaces with the communication portion 718 of the computer 700. The computer 700 also receives information from the vibration sensors 104 and 105 via a communication link 804, which interfaces with the communication portion 718 of the computer 700. The data processed by the computer 700 is stored in the database 803, which may be a part of the recording portion 716, or connected via a communication link 805, which interfaces with the communication portion 718 of the computer 700.

FIGS. 9A-9F each show an exemplary graphical user interface that is embodied in a portion of a computer screen, monitor, or other display panel. The portion of the interface shown in broken lines is unclaimed subject matter. Additionally, in an exemplary embodiment, the appearance of the graphical user interface shown in FIGS. 9A and 9B sequentially transitions between the images shown in FIGS. 9A and 9B.

The various processes discussed above need not be processed chronologically or concurrently in the sequence depicted as flowcharts; the steps may also include those processed parallelly, serially, or individually (e.g., in paralleled or object-oriented fashion).

Also, the programs may be processed by a single computer or by a plurality of computers on a distributed basis. The programs may also be transferred to a remote computer or computers for execution.

Furthermore, in this specification, the term "system" means an aggregate of a plurality of component elements (apparatuses, modules (parts), displays etc.). All component elements may or may not be housed in a single enclosure. Therefore, a plurality of component elements each housed in a separate enclosure and connected via a network are considered a network, and a single component formed by a plurality of modules housed in a single enclosure are also regarded as a system.

Also, it should be understood that this technology when embodied is not limited to the above-described embodiments and that various modifications, variations and alternatives may be made of this technology so far as they are within the spirit and scope thereof. For example, this technology may be structured for cloud computing whereby a single function is shared and processed in collaboration among a plurality of apparatuses via a network.

The above disclosure also encompasses the embodiments noted below.

(1) A system, including circuitry configured to generate chatter information based on sensor data collected from a machining operation performed at a previously selected tool speed setting, the chatter information including a chatter level value and a chatter frequency value. The circuitry is further configured to determine a plurality of different candidate tool speed settings, which are predicted to reduce or eliminate chatter, based on the generated chatter frequency value from the machining operation, generate a user interface that includes a plurality of different tool speed settings, including a plurality of different tool speed settings, including the previously selected speed setting and the plurality of different candidate tool speed settings for selection by a user, in which the user interface is configured to indicate the chatter level value for the previously selected tool speed setting.

(2) The system of feature (1), in which the circuitry is further configured to, when one of the different candidate tool speed settings is selected by the user, generate second chatter information based on sensor data collected from a machining operation performed at the selected one of the different candidate tool speed settings, and determine a second plurality of different candidate tool speed settings, which are predicted to reduce or eliminate chatter, based on a chatter frequency value included in the second chatter information. The plurality of different tool speed settings, included in the user interface, is updated to include the second plurality of different candidate tool speed settings.

(3) The system of feature (1) or (2), in which the plurality of different tool speed settings includes a plurality of previously selected tool speed settings, the circuitry is further configured to determine, for each of the previously selected tool speed settings, a color that represents a measured chatter level value of the respective previously selected tool speed setting, and the user interface is configured to indicate, for each of the previously selected tool speed settings, the measured chatter level value of the respective previously selected speed setting using the determined color for the respective previously selected tool speed setting.

(4) The system of feature (3), in which the circuitry is further configured to determine the color that represents the chatter level value of the respective previously selected tool speed setting based on a color scale in which green represent a predetermined minimum chatter level and red represents a predetermined maximum chatter level.

(5) The system of any of features (1) to (4), in which the user interface is configured to display a subset of the plurality of different tool speed settings, each of the subset of the plurality of different tool speed settings being represented by a different element, and the subset of the plurality of different tool speed setting is determined based on a user input.

(6) The system of feature (5), in which the circuitry is further configured to determine when one of the elements is selected, and activate a tool speed corresponding to the selected one of the elements.

(7) The system of feature (6), in which the circuitry is further configured to determine when the one of the elements is selected by determining when a position of the one of the elements is changed.

(8) The system of any of features (5) to (7), in which each of the elements includes corresponding lobe information that identifies a stability lobe number corresponding to the tool speed setting associated with the respective element.

(9) The system of any of features (5) to (8), in which the user interface includes a history bar that indicates a predetermined permissible range of tool speed settings and an indication of which portion of the predetermined permissible range corresponds to the subset of the plurality of different tool speed settings.

(10) The system of feature (9), in which the history bar is configured to display a measured chatter level for each previously selected tool speed setting included in the user interface.

(11) The system of any of features (1) to (10), in which the user interface further includes a chatter gauge element that indicates two or more of a real-time chatter level, a user adjustable chatter threshold setting, and predetermined gauge markings corresponding to different chatter levels.

(12) The system of feature (11), in which the chatter gauge element indicates the real-time chatter level associated with a currently selected one of the determined plurality of different tool speed settings.

(13) A method for controlling chatter, the method including generating, by circuitry, chatter information based on sensor data collected from a machining operation performed at a previously selected tool speed setting, the chatter information including a chatter level value and a chatter frequency value; determining, by the circuitry, a plurality of different candidate tool speed settings, which are predicted to reduce or eliminate chatter, based on the generated chatter frequency value from the machining operation; generating, by the circuitry, a user interface that includes a plurality of different tool speed settings, including the previously selected tool speed setting and the plurality of different candidate tool speed settings for selection by a user; and indicating, in the user interface by the circuitry, the chatter level value for the previously selected tool speed setting.

(14) The method of feature (13), further including, when one of the different candidate tool speed settings is selected by the user, generating second chatter information based on sensor data collected from a machining operation performed at the selected one of the different candidate tool speed settings, and determining a second plurality of different candidate tool speed settings, which are predicted to reduce or eliminate chatter, based on a chatter frequency value included in the second chatter information, in which the plurality of different tool speed settings, included in the user interface, is updated to include the second plurality of different candidate tool speed settings.

(15) The method of feature (13) or (14), in which the plurality of different tool speed settings includes a plurality of previously selected tool speed settings, the method further includes determining, for each of the previously selected tool speed settings, a color that represents a measured chatter level value of the respective previously selected tool speed setting, and the user interface is configured to indicate, for each of the previously selected tool speed settings, the measured chatter level value of the respective tool speed setting using the determined color for the respective previously selected tool speed setting.

(16) The method of feature (15), in which the method determines the color that represents the chatter level value of the respective previously selected tool speed setting based on a color scale in which green represent a predetermined minimum chatter level and red represents a predetermined maximum chatter level.

(17) The method of any of features (13) to (16), in which the user interface is configured to display a subset of the plurality of different tool speed settings, each of the subset of the plurality of different tool speed settings being represented by a different element, and the subset of the plurality of different tool speed setting is determined based on a user input.

(18) The method of feature (17), in which the method further includes determining when one of the elements is selected, and activating a tool speed corresponding to the selected one of the elements.

(19) The method of feature (18), in which the method of determining includes determine when the one of the elements is selected by determining when a position of the one of the elements is changed.

(20) The method of feature (17) or (19), in which each of the elements includes corresponding lobe information that identifies a stability lobe number corresponding to the tool speed setting associated with the respective element.

(21) The method of any of features (17) to (20), in which the user interface includes a history bar that indicates a predetermined permissible range of tool speed settings and an indication of which portion of the predetermined permissible range corresponds to the subset of the plurality of different tool speed settings.

(22) The method of feature (21), in which the history bar is configured to display a measured chatter level for each previously selected tool speed setting included in the user interface.

(23) The method of any of features (13) to (22), in which the user interface further includes a chatter gauge element that indicates two or more of a real-time chatter level, a user adjustable chatter threshold setting, and predetermined gauge markings corresponding to different chatter levels.

(24) The method of feature (23), in which the chatter gauge element indicates the real-time chatter level associated with a currently selected one of the determined plurality of different tool speed settings.

(25) A non-transitory computer-readable medium storing a program which when executed by a computer, causes the computer to perform a method for controlling chatter, the method including generating chatter information based on sensor data collected from a machining operation performed at a previously selected tool speed setting, the chatter information including a chatter level value and a chatter frequency value; determining a plurality of different candidate tool speed settings, which are predicted to reduce or eliminate chatter, based on the generated chatter frequency value from the machining operation; generating a user interface that includes a plurality of different tool speed settings, including the previously selected tool speed setting and he plurality of different candidate tool speed settings for selection by a user; and indicating, in the user interface the chatter level value for the previously selected tool speed setting.

(26) The non-transitory computer-readable medium of feature (25), in which the program, when executed by the computer, further causes the computer to perform the method of any of features (14) to (24).

What is claimed is:

1. A system, comprising:
   circuitry configured to
   generate chatter information based on sensor data collected from a machining operation performed at a previously selected tool speed setting, the chatter information including a chatter level value and a chatter frequency value,
   determine a plurality of different candidate tool speed settings, which are predicted to reduce or eliminate chatter, based on the generated chatter frequency value from the machining operation, and
   generate a user interface that includes a plurality of different tool speed settings, including the previously selected tool speed setting and the plurality of different candidate tool speed settings for selection by a user, wherein
   the user interface is configured to indicate the chatter level value for the previously selected tool speed setting, wherein
   the user interface is configured to display a subset of the plurality of different tool speed settings, each of the subset of the plurality of different tool speed settings being represented by a different element, and
   the subset of the plurality of different tool speed settings is determined based on a user input.

2. The system according to claim 1, wherein
   the circuitry is further configured to, when one of the different candidate tool speed settings is selected by the user,
   generate second chatter information based on sensor data collected from a machining operation performed at the selected one of the different candidate tool speed settings, and
   determine a second plurality of different candidate tool speed settings, which are predicted to reduce or eliminate chatter, based on a chatter frequency value included in the second chatter information, wherein
   the plurality of different tool speed settings, included in the user interface, is updated to include the second plurality of different candidate tool speed settings.

3. The system according to claim 1, wherein
   the plurality of different tool speed settings includes a plurality of previously selected tool speed settings,
   the circuitry is further configured to determine, for each of the previously selected tool speed setting, a color that represents a measured chatter level value of the respective previously selected tool speed setting, and
   the user interface is configured to indicate, for each of the previously selected tool speed settings, the measured chatter level value of the respective previously selected tool speed setting using the determined color for the respective previously selected tool speed setting.

4. The system according to 3, wherein the circuitry is further configured to:
   determine the color that represents the chatter level value of the respective previously selected tool speed setting based on a color scale in which green represent a predetermined minimum chatter level and red represents a predetermined maximum chatter level.

5. The system according to claim 1, wherein the circuitry is further configured to:
   determine when one of the elements is selected, and
   activate a tool speed corresponding to the selected one of the elements.

6. The system according to claim 1, wherein each of the elements includes corresponding lobe information that identifies a stability lobe number corresponding to the tool speed setting associated with the respective element.

7. The system according to claim 1, wherein the user interface includes a history bar that indicates a predetermined permissible range of tool speed settings and an indication of which portion of the predetermined permissible range corresponds to the subset of the plurality of different tool speed settings.

8. The system according to claim 7, wherein the history bar is configured to display a measured chatter level for each previously selected tool speed setting included in the user interface.

9. A method for controlling chatter, the method comprising:
   generating, by circuitry, chatter information based on sensor data collected from a machining operation performed at a previously selected, tool speed setting, the chatter information including a chatter level value and a chatter frequency value;
   determining, by the circuitry, a plurality of different candidate tool speed settings, which are predicted to reduce or eliminate chatter, based on the generated chatter frequency value from the machining operation;
   generating, by the circuitry, a user interface that includes a plurality of different tool speed settings, including the previously selected tool speed setting and the plurality of different candidate tool speed settings for selection by a user; and indicating, in the user interface by the circuitry, the chatter level value for the previously selected tool speed setting, wherein the user interface is configured to display a subset of the plurality of different tool speed settings, each of the subset of the plurality of different tool speed settings being represented by a different element, and the subset of the plurality of different tool speed settings is determined based on a user input.

10. A non-transitory computer-readable medium storing a program which when executed by a computer, causes the computer to perform a method for controlling chatter, the method comprising:

generating chatter information based on sensor data collected from a machining operation performed at a previously selected tool speed setting, the chatter information including a chatter level value and a chatter frequency value;

determining a plurality of different candidate tool speed settings, which are predicted to reduce or eliminate chatter based on the generated chatter frequency value from the machining operation;

generating a user interface that includes a plurality of different tool speed settings, including the previously selected tool speed setting and the plurality of different candidate tool speed settings for selection by a user; and indicating, in the user interface, the chatter level value for the previously selected tool speed setting, wherein the user interface is configured to display a subset of the plurality of different tool speed settings, each of the subset of the plurality of different tool speed settings being represented by a different element, and the subset of the plurality of different tool speed settings is determined based on a user input.

11. The non-transitory computer-readable medium according to claim 10, wherein the plurality of different tool speed settings includes a plurality of previously selected tool speed settings, the method further includes determining, for each of the previously selected tool speed setting, a color that represents a measured chatter level value of the respective previously selected tool speed setting, and the user interface is configured to indicate, for each of the previously selected tool speed settings, the measured chatter level value of the respective previously selected tool speed setting using the determined color for the respective previously selected tool speed setting.

12. New The non-transitory computer-readable medium according to claim 10, the method further comprising:

determining when one of the elements is selected, and activating a tool speed corresponding to the selected one of the elements.

13. The non-transitory computer-readable medium according to claim 10, wherein each of the elements includes corresponding lobe information that identifies a stability lobe number corresponding to the tool speed setting associated with the respective element.

14. The non-transitory computer-readable medium according to claim 10, wherein the user interface includes a history bar that indicates a predetermined permissible range of tool speed settings and an indication of which portion of the predetermined permissible range corresponds to the subset of the plurality of different tool speed settings.

15. The non-transitory computer-readable medium according to claim 14, wherein the history bar is configured to display as measured chatter level for each previously selected tool speed setting included in the user interface.

16. A system, comprising:

circuitry configured to generate chatter information based on sensor data collected from a machining operation performed at a previously selected tool speed setting, the chatter information including a chatter level value and a chatter frequency value, determine a plurality of different candidate tool speed settings, which are predicted to reduce or eliminate chatter, based on the generated chatter frequency value from the machining operation, and generate a user interface that includes a plurality of different tool speed settings, including the previously selected tool speed setting and the plurality of different candidate tool speed settings for selection by a user, wherein the user interface is configured to indicate the chatter level value for the previously selected tool speed setting, wherein the user interface further includes a chatter gauge element that indicates two or more of a real-time chatter level, a user adjustable chatter threshold setting, and predetermined gauge markings corresponding to different chatter levels.

17. The system according to claim 16, wherein the chatter gauge element indicates the real-time chatter level associated with a currently selected one of the determined plurality of different tool speed settings.

18. A method for controlling chatter, the method comprising;

generating, by circuitry, chatter information based on sensor data collected from a machining operation performed at a previously selected tool speed setting, the chatter information including a chatter level value and a chatter frequency value;

determining, by the circuitry, a plurality of different candidate tool speed settings, which are predicted to reduce or eliminate chatter, based on the generated chatter frequency value from the machining operation;

generating, by the circuitry, a user interface that includes a plurality a different tool speed settings, including the previously selected tool speed setting and the plurality of different candidate tool speed settings for selection by a user; and indicating, in the user interface by the circuitry, the chatter level value for the previously selected tool speed setting, wherein the user interface further includes a chatter gauge element that indicates two or more of a real-time chatter level, a user adjustable chatter threshold setting, and predetermined gauge markings corresponding to different chatter levels.

19. A non-transitory computer-readable medium storing a program which when executed by a computer, causes the computer to perform a method for controlling chatter, the method comprising:

generating chatter information based on sensor data collected from a machining operation performed at a previously selected tool speed setting, the chatter information including a chatter level value and a chatter frequency value;

determining a plurality of different candidate tool speed settings, which are predicted to reduce or eliminate chatter based on the generated chatter frequency value from the machining operation;

generating a user interface that includes a plurality of different tool speed settings, including the previously selected tool speed setting and the plurality of different candidate tool speed settings for selection by a user; and indicating, in the user interface, the chatter level value for the previously selected tool speed setting, wherein the user interface further includes a chatter gauge element that indicates two or more of a real-time chatter level, a user adjustable chatter threshold setting, and predetermined gauge markings corresponding, to different chatter levels.

20. The non-transitory computer-readable medium according to claim 19, wherein the chatter gauge element indicates the real-time chatter level associated with a currently selected one of the determined plurality of different tool speed settings.

* * * * *